United States Patent
Bhongale et al.

(10) Patent No.: US 11,320,615 B2
(45) Date of Patent: May 3, 2022

(54) GRAPHENE BARRIERS ON WAVEGUIDES

(71) Applicant: Halliburton Energy Services, Inc., Houston, TX (US)

(72) Inventors: Satyan Gopal Bhongale, Cypress, TX (US); Jerzy Gazda, Austin, TX (US); Etienne M. Samson, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 326 days.

(21) Appl. No.: 15/513,465

(22) PCT Filed: Oct. 30, 2014

(86) PCT No.: PCT/US2014/063204
§ 371 (c)(1),
(2) Date: Mar. 22, 2017

(87) PCT Pub. No.: WO2016/068952
PCT Pub. Date: May 6, 2016

(65) Prior Publication Data
US 2017/0299828 A1 Oct. 19, 2017

(51) Int. Cl.
*G01J 5/16* (2006.01)
*G02B 6/44* (2006.01)
*G02B 6/02* (2006.01)
*E21B 47/001* (2012.01)
(Continued)

(52) U.S. Cl.
CPC ............ *G02B 6/443* (2013.01); *E21B 47/001* (2020.05); *E21B 47/135* (2020.05); *G01D 5/353* (2013.01); *G02B 6/02395* (2013.01); *G02B 6/4427* (2013.01); *G02B 6/4494* (2013.01); *G02B 6/441* (2013.01); *G02B 6/4416* (2013.01)

(58) Field of Classification Search
CPC .. G02B 6/443; G02B 6/4427; G02B 6/02395; G02B 6/4494; E21B 47/123; E21B 47/0001
USPC .................................................... 250/227.14
See application file for complete search history.

(56) References Cited

U.S. PATENT DOCUMENTS

| 6,945,095 B2 * | 9/2005 | Johansen | E21B 47/10 73/61.45 |
|---|---|---|---|
| 8,096,353 B2 | 1/2012 | Ver Meer | |
| 9,328,018 B2 * | 5/2016 | Winarski | G02B 6/02395 |

(Continued)

OTHER PUBLICATIONS

International Search Report and Written Opinion for Application No. PCT/US2014/063204 dated Jul. 27, 2015.

(Continued)

*Primary Examiner* — Georgia Y Epps
*Assistant Examiner* — Kevin Wyatt
(74) *Attorney, Agent, or Firm* — Thomas Rooney; C. Tumey Law Group PLLC (57) ABSTRACT

Systems and methods are provided for applying a protective graphene barrier to waveguides and using the protected waveguides in wellbore applications. A well monitoring system may comprise a waveguide comprising a graphene barrier, wherein the graphene barrier comprises at least one material selected from the group consisting of graphene, graphene oxide, and any combination thereof; a signal generator capable of generating a signal that travels through the waveguide; and a signal detector capable of detecting a signal that travels through the waveguide.

19 Claims, 8 Drawing Sheets

(51) Int. Cl.
*E21B 47/135* (2012.01)
*G01D 5/353* (2006.01)

(56) References Cited

U.S. PATENT DOCUMENTS

| | | | |
|---|---|---|---|
| 9,336,929 B2 | 5/2016 | Holzmueller et al. | |
| 2003/0137653 A1* | 7/2003 | Kawabata | G01M 11/33 356/73.1 |
| 2006/0282068 A1* | 12/2006 | Griffin | A61B 18/22 606/13 |
| 2007/0047867 A1 | 3/2007 | Goldner | |
| 2008/0247718 A1* | 10/2008 | Dowd | E21B 17/206 385/113 |
| 2010/0278491 A1* | 11/2010 | Noddings | G02B 6/443 385/100 |
| 2011/0100710 A1* | 5/2011 | Fossli | E21B 21/001 175/7 |
| 2012/0088123 A1* | 4/2012 | Choi | B82Y 30/00 428/688 |
| 2013/0167944 A1* | 7/2013 | Egeland | E21B 33/064 137/15.18 |
| 2013/0183177 A1 | 7/2013 | Manke et al. | |
| 2014/0027116 A1 | 1/2014 | Suresh et al. | |
| 2014/0204384 A1* | 7/2014 | Lee | G01N 21/7703 356/437 |
| 2015/0376956 A1* | 12/2015 | Richards | F16L 25/02 166/65.1 |
| 2016/0131622 A1* | 5/2016 | Akbari Khorami | G01N 31/228 436/135 |

OTHER PUBLICATIONS

Wafer-scale Reduced Graphene Oxide Films for Nanomechanical Devices by Robinson et al dated Jul. 30, 2008.
Chemically Derived Graphene Oxide: Towards Large-Area Thin-Film Electronics and Optoelectronics by eda et al dated Apr. 28, 2010.
Preparation and Characterization of graphene oxide paper by Dikin et al. dated Jul. 26, 2007.
Unimpeded Permeation of Water Through Helium-Leak-Tight Graphene-Based Membranes by Nair et al. dated May 30, 2012.

* cited by examiner

GRAPHENE BARRIERS ON WAVEGUIDES

BACKGROUND

Provided are systems and methods that utilize graphene barriers for waveguides. More particularly, systems and methods are provided for applying a protective graphene barrier to waveguides and using the protected waveguides in wellbore applications.

Waveguides may be used in various types of wellbore applications. Generally, the waveguides may be used to measure ambient conditions such as temperature and pressure; dynamic properties such as temperature, pressure, and vibrations; acoustic signatures of tools and processes; and properties of the geological formation, as well as the compositional properties of fluids within and in the vicinity of the wellbore, for example, oil and water. Without limitation, these waveguides may include, fiber optic cables, fiber optic sensors (including point or distributed), and optical components or elements of optical components. During the lifecycle of a wellbore, waveguides may be subject to degradation due to a phenomenon known as "hydrogen darkening." Hydrogen darkening may cause a loss in performance due to the degradation of the optical properties of the waveguides. Hydrogen present in the wellbore may diffuse into the waveguides and "darken" the optical properties of the waveguides; whereby light passing through degraded waveguides may be attenuated. Consequently, this effect may result in a noisy or lost signal. This may be of particular concern in certain types of waveguides, for example sensors based on erbium-doped fiber lasers, or in waveguides that utilize certain frequencies.

Examples of past techniques for addressing these issues include avoiding certain types of waveguides, as well as certain frequency bands, if they are to be used in environments where hydrogen diffusion may be present. However, this solution does not allow for sufficient flexibility with regards to the selection of waveguides for a specific sensing method and would therefore be limiting in the type of sensing and analysis that may be done. Furthermore, most wellbore applications are susceptible to hydrogen diffusion due to the cracking of hydrocarbons. Alternatively, graphite-coated fibers have been prepared to mitigate hydrogen darkening. Typically, this amorphous coating may be applied by thermal decomposition of a hydrocarbon gas in the absence of oxygen. Moreover, these coatings must be applied as elevated temperatures during deposition. However, the coating applications known are expensive and inefficient. Further, the actual coatings do not protect the waveguides to a degree sufficient for use in certain sensing applications above 150° C., and more particularly, these coatings may not provide any reduction in hydrogen diffusion for specific types of waveguides. Therefore, preventing or mitigating hydrogen darkening in waveguides may reduce cost, waste, and may also increase the operational efficiency of wellbore operations.

BRIEF DESCRIPTION OF THE DRAWINGS

These drawings illustrate certain aspects of some of the embodiments of the present invention, and should not be used to limit or define the invention.

DETAILED DESCRIPTION

Provided are systems and methods that utilize graphene barriers for waveguides. More particularly, systems and methods are provided for applying a protective graphene barrier to waveguides and using the protected waveguides in wellbore applications.

The term "waveguide," as used herein, refers to physical structures that guide electromagnetic waves. The waveguides may comprise any optical fibers, cables, components, elements of components, etc. that may be subject to hydrogen darkening. The waveguide may be used in any application requiring such waveguides, however, preferred usage is for wellbore applications and/or applications where hydrogen diffusion into the waveguides is a potential issue. A protective barrier comprising graphene and/or graphene oxide may be used to mitigate hydrogen darkening. As used herein, unless otherwise noted, "graphene" may refer to graphene, graphene oxide, or the combination of graphene and graphene oxide. The methods of applying a protective barrier of graphene to the waveguides may generally comprise coating the waveguides, the bundles of waveguides, or any surfaces disposed about waveguides with at least one layer of graphene. Once the graphene has been applied, the waveguides may comprise a protective barrier that prevents or slows hydrogen diffusion into parts sensitive to hydrogen attack within the waveguides. Methods of using the protected waveguides may comprise introduction of the protected waveguides into a wellbore and using the protected waveguides to perform optical-sensing applications. The systems disclosed herein may comprise waveguides, graphene, and components capable of applying a protective barrier of graphene to the waveguides.

One of the many potential advantages of the methods and systems described herein is that the application of graphene may be cost-effective for use in wellbore operations. An additional advantage is that the protected waveguides may have no or reduced physical degradation due to hydrogen diffusion and may therefore possess a longer operational life. A further advantage is that the protected waveguides may not attenuate the light passing through such materials, and thus the waveguides may comprise an overall clearer signal. Clear signals may be important for obtaining accurate and sensitive readings and measurements from sensing operations.

Figure 1:
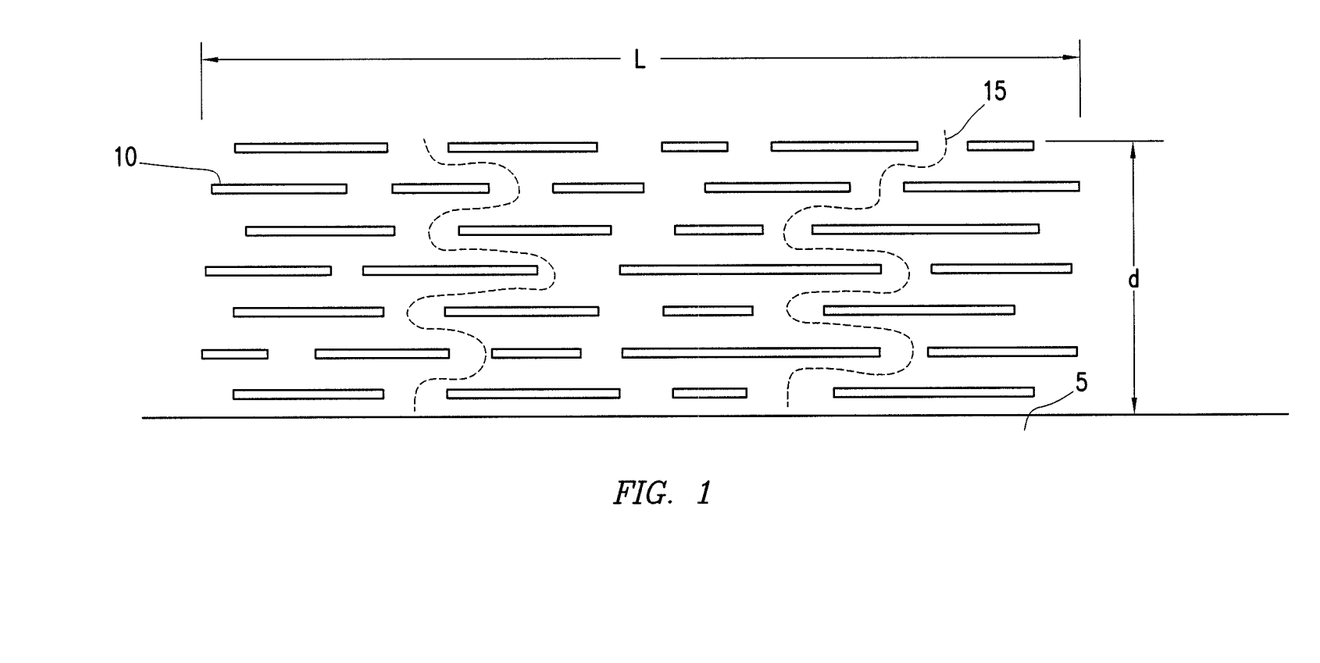
FIG. 1 is an illustration of an example waveguide comprising a protective barrier of graphene.

FIG. 1 is an example of a waveguide comprising a protective barrier of graphene. As illustrated, a plurality of layers of a graphene barrier 10 may be disposed on waveguide 5, having length L and depth d. comprises. Graphene barrier 10 may prevent or slow hydrogen diffusion 15 across graphene barrier 10. Thus, graphene barrier 10 may protect waveguide 5 from degradation due to hydrogen darkening.

As discussed above, waveguide 5 may comprise optical fibers, cables, components, elements of components, etc. Without limitation, examples of these may include, fiber optics, optical cables, bundles of fiber optics or optical cables, fiber optic sensors (of any type, including point or distributed), optical connectors, splice housings, optical circuits, the like and also any elements or subassemblies of the waveguides listed above. With the benefit of this disclosure, one having ordinary skill in the art may be able to select an appropriate type of waveguide 5 for use.

Graphene barrier 10 may comprise graphene, graphene oxide, or a combination thereof. Graphene barrier 10 may comprises a single layer or a plurality of layers of graphene and/or graphene oxide, for example, graphene barrier 10 may form a laminate of plural graphene sheets. Any type of graphene or graphene oxide may be used for graphene barrier 10. Any physical form of graphene or graphene oxide may be used to form graphene barrier 10, for example, graphene barrier 10 may be formed from a suspension of graphene oxide applied to a surface, e.g., by spraying, painting, using an ink jet, or extrusion over the surface. Graphene barrier 10 may be continuous along the length or surface of any waveguide 5 and may be from about one graphene layer in thickness (e.g., on the order of a few nanometers) to about 50 μm. With the benefit of this disclosure, one having ordinary skill in the art may be able to select an appropriate type of graphene barrier for use.

Figure 2:
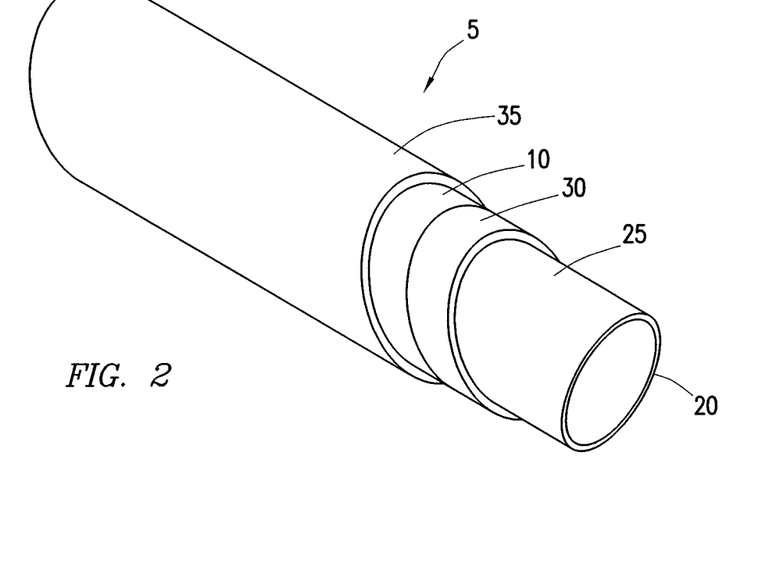
FIG. 2 is an illustration of an example waveguide with a portion cut away so that the interior of the waveguide is exposed.

FIG. 2 is an example illustration of a waveguide 5 with a portion cut away so that the interior of the waveguide 5 is exposed. In FIG. 2, waveguide 5 comprises an optical fiber 20. Optical fiber 20 comprises a core 25, a cladding 30, and a polymer buffer 35 (also known as a coating). In FIG. 2, optical fiber 20 may be a single-mode or multi-mode optical fiber. Any type of optical fiber may be substituted for optical fiber 20. Core 25 may be any type of core, for example a silica core, and may comprise any suitable diameter. Cladding 30 may be any type of cladding, for example a silica cladding. Cladding 30 may be doped and if doped, the dopant may be any suitable dopant, for example, silica, erbium, and the like. Polymer buffer 35 may be any polymer buffer sufficient for protecting the interior of optical fiber 20 from damage, for example, a polyimide and acrylate polymer buffer. As shown in FIG. 2, optical fiber 20 may comprise graphene barrier 10 disposed between cladding 30 and polymer buffer 35. Alternatively, the graphene barrier 10 may also be placed outside polymer buffer 35 or both outside polymer buffer 35 and between the cladding 30 and polymer buffer 35. Any hydrogen that may diffuse across polymer buffer 35 may be prevented from attacking cladding 30 and core 25 or may have its rate of diffusion slowed by graphene barrier 10.

Figure 3:
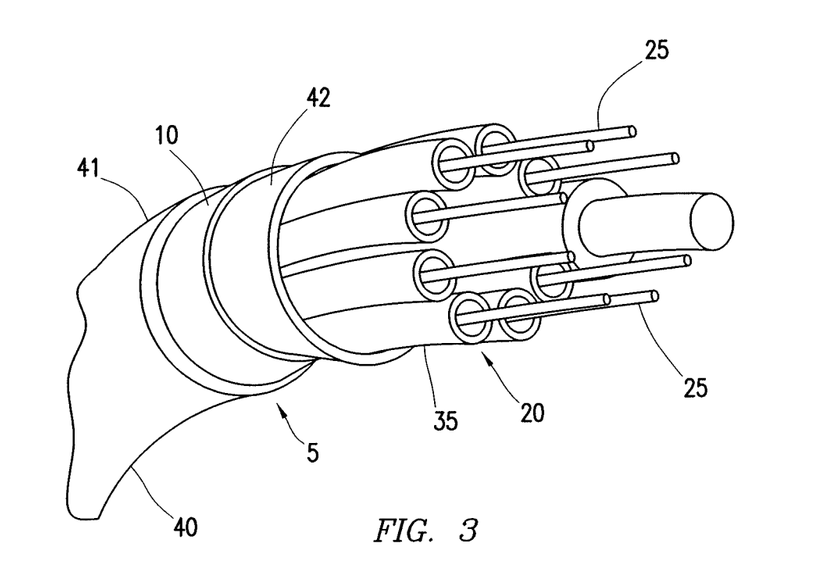
FIG. 3 is another illustration of an example waveguide with a portion cut away so that the interior of the waveguide is exposed.

FIG. 3 is another example illustration of a waveguide 5 with a portion cut away so that the interior of waveguide 5 is exposed. In FIG. 3, waveguide 5 comprises a bundle of optical fibers 20. For the purposes of this example, the optical fibers 20 in the bundle are identical to the optical fibers 20 as illustrated in FIG. 2. However, it should be recognized that any optical fibers may be substituted for optical fibers 20 in the bundle of optical fibers 20 illustrated by FIG. 3. The bundle of optical fibers 20 may be bundled by a jacket 40. Jacket 40 may comprise a single or multiple layers and may also comprise any such material suitable for protecting an optical fiber 20 from damage. In FIG. 3, jacket 40 comprises a polymer layer 41 and a metal layer 42. Examples of materials may include, but should not be limited to plastics, metals, etc. In FIG. 3, graphene barrier 10 may be disposed between any such layers of jacket 40, on the surface of polymer buffer 35 for each optical fiber 20 in the bundle, and/or beneath the surface of polymer buffer 35 for each optical fiber 20 in the bundle. FIG. 3 thus illustrates that graphene barrier 10 may occupy a single or multiple locations.

Figure 4:
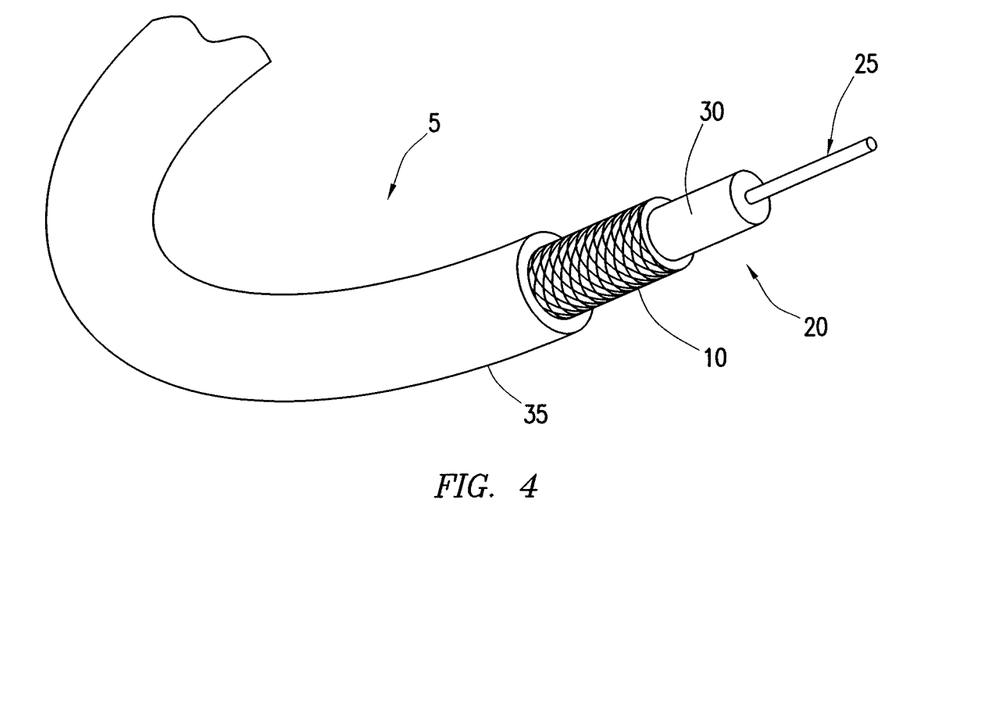
FIG. 4 is a further illustration of an example waveguide with a portion cut away so that the interior of the waveguide is exposed.

FIG. 4 is a further example illustration of a waveguide 5 with a portion cut away so that the interior of waveguide 5 is exposed. In FIG. 4, waveguide 5 comprises optical fiber 20. For the purposes of this example, optical fiber 20 is identical to the optical fiber 20 illustrated in FIGS. 2 and 3. However, it should be recognized that any optical fiber may be substituted for the optical fiber 20 illustrated by FIG. 4. In FIG. 4, graphene barrier 10 is the form of a tape comprising an outer graphene oxide coating. Graphene barrier 10 may be wound or woven around cladding 30 in any manner, for example, a helical manner. Graphene barrier 10 may then be covered by polymer buffer 35. Alternatively, graphene barrier 10 may be individually wound or woven around separate optical fibers 20 in bundle of optical fibers 20 and then said bundle of optical fibers 20 may be covered by jacket 40.

Figure 5:
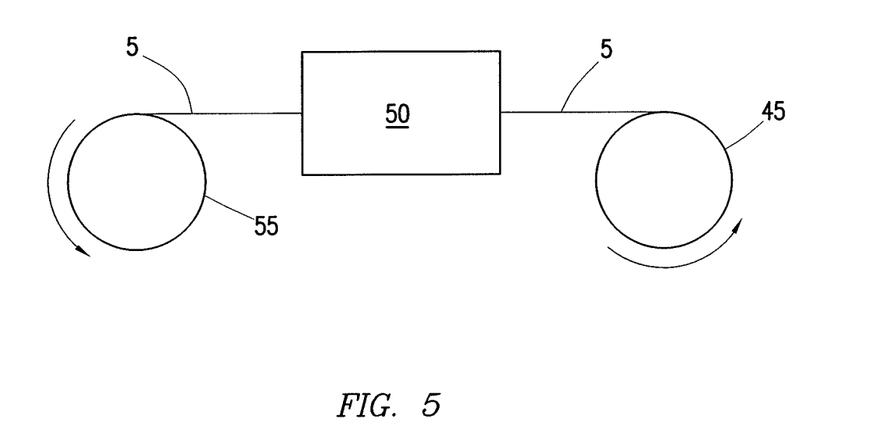
FIG. 5 is a generalized illustration of an example technique for applying a graphene barrier to a waveguide such as an optical fiber.

FIG. 5 is a generalized illustration of an example technique for applying a graphene barrier 10 (e.g., FIGS. 1-4) to a waveguide 5 such as optical fiber 20 (e.g., FIGS. 1-4). Feed reel 45 may feed a length of waveguide 5 through a graphene applicator 50. Graphene applicator 50 may apply graphene barrier 10 to waveguide 5 as waveguide 5 is fed through graphene applicator 50 from feed reel 45. As waveguide 5 exits graphene applicator 50, waveguide 5 may be spooled to uptake reel 55. Uptake reel 55 may spool waveguide 5 comprising graphene barrier 10 for transport or use.

Figure 6:
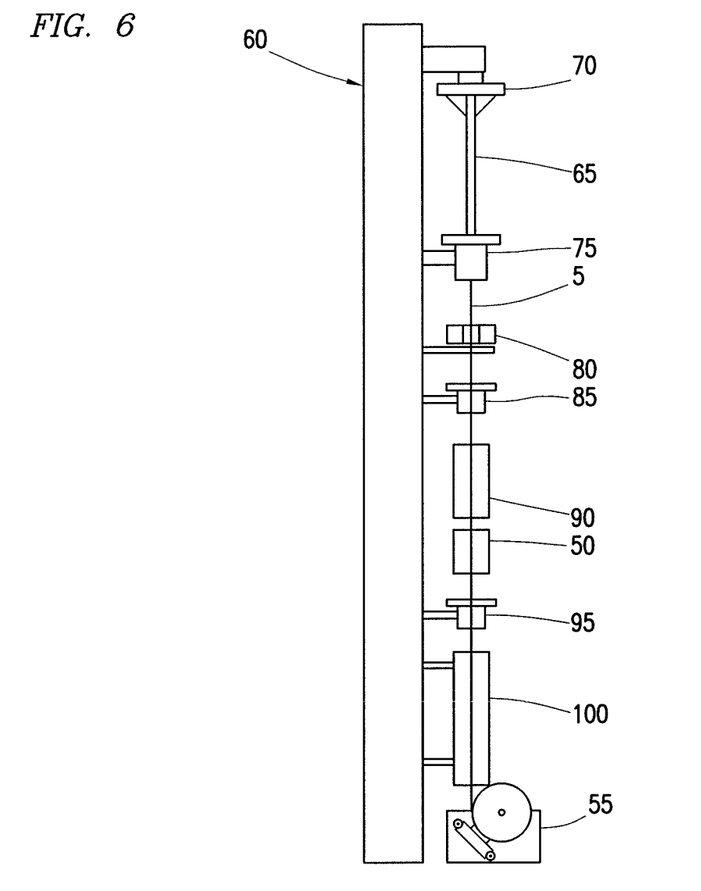
FIG. 6 is another generalized illustration of an example technique for applying a graphene barrier to a waveguide such as an optical fiber.

FIG. 6 is another generalized example of applying a graphene barrier 10 (e.g., FIGS. 1-4) to a waveguide 5 such as optical fiber 20 (e.g., FIGS. 1-4). FIG. 6 generally describes a vertical fiber drawing system 60 which may be used in conjunction with any suitable waveguide manufacturing process such as modified chemical vapor deposition. As illustrated in FIG. 6, solid preform 65, produced from a waveguide manufacturing process, may be fed from preform feed 70 to furnace 75. As solid preform 65 is drawn through furnace 75, solid preform may be converted to waveguide 5. The diameter and concentricity of waveguide 5 may be measured by laser micrometer 80. After measurement by laser micrometer 80, waveguide 5 may be drawn through first coating cup 85. First coating cup 85 may contain the material necessary to form polymer buffer 35 on waveguide 5. In alternative embodiments, first coating cup 85 may be an extrusion apparatus in which a pre-blended composite material comprising a polymer-graphene mixture may be applied. Waveguide 5 may then pass through first curing oven 90. After passing through first curing oven 90, waveguide 5 may pass through graphene applicator 50. Graphene applicator 50 described in FIG. 6 is analogous in purpose to graphene applicator 50 described in FIG. 5, and as such, graphene applicator 50 in FIG. 6 may apply graphene barrier 10 to waveguide 5 as waveguide 5 is fed through graphene applicator 50. After exiting graphene applicator 50, waveguide 5 may be fed through second coating cup 95. Second coating cup 95 may apply a second coating, such as a second polymer buffer 35 or material that may form jacket 40 if waveguide 5 is a bundle of waveguides 5. After being drawn through second coating cup 95, waveguide 5 may enter a second curing oven 100 and may then be spooled by uptake reel 55 for transport or use. In alternative examples, graphene applicator 50 may be placed on vertical fiber drawing system 60 prior to first coating cup 85. As such graphene barrier 10 may be applied to waveguide 5 prior to any polymer buffer 35. In this alternative example, second coating cup 95 and second curing oven 100 may be optional.

Graphene applicator 50 as described above may be any such graphene applicator suitable for use. Without limitation, examples of a graphene applicator 50 may include paint/ink dispensers, a polymer extrusion apparatus, or a vacuum apparatus with a plasma or gas reactor. In some applications, graphene barrier 10 may be applied at an ambient laboratory environment or at low temperatures, (e.g., temperatures less than 100° C.). With the benefit of this disclosure, one having ordinary skill in the art may be able to select an appropriate type of graphene applicator for use.

As described above, a composite material comprising graphene and a polymer may be used to provide a combination graphene barrier 10 and polymer buffer 35 for waveguide 5. The composite material may comprise a mixture of any such graphene and/or graphene oxide with any such compatible polymer. The polymer may be any of the polymers sufficient for use as polymer buffer 35 or may be a polymer sufficient for combination with graphene and/or graphene oxide. The composite material may provide both functionalities of the polymer buffer 35 and the graphene barrier 10 and may therefore be used in place of both. Alternatively, the composite material may only provide one of the functionalities of polymer buffer 35 or graphene barrier 10 and may therefore only be used in place of one. With the benefit of this disclosure, one having ordinary skill in the art may be able to select an appropriate type of composite material for use.

Figure 7:
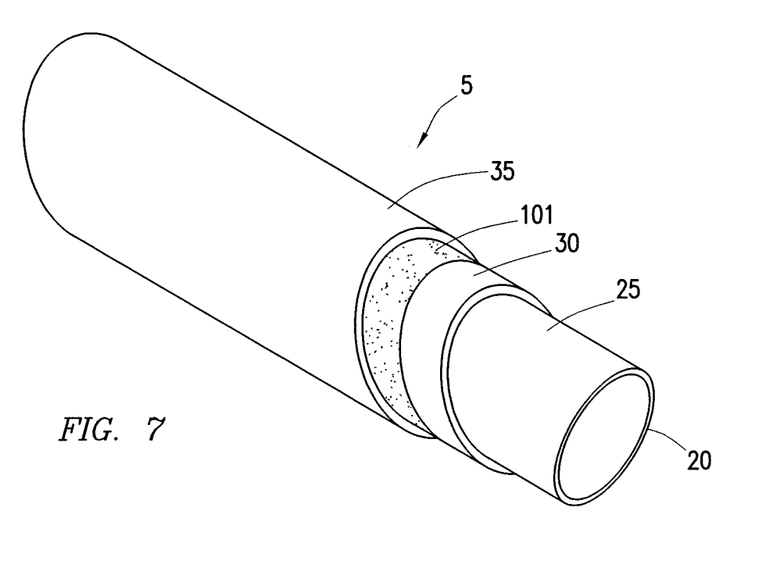
FIG. 7 illustrates an example waveguide 5 comprising a graphene and polymer composite barrier.

FIG. 7 is an example waveguide 5 comprising an identical optical fiber 20 as illustrated in FIG. 2, however, a composite barrier 101 comprising graphene and a polymer has been substitute for graphene barrier 10. As shown in FIG. 7, composite barrier 101 is disposed between cladding 30 and polymer buffer 35. Composite barrier 101 may be substitute for any embodiment of graphene barrier 10 described herein.

Figure 8:
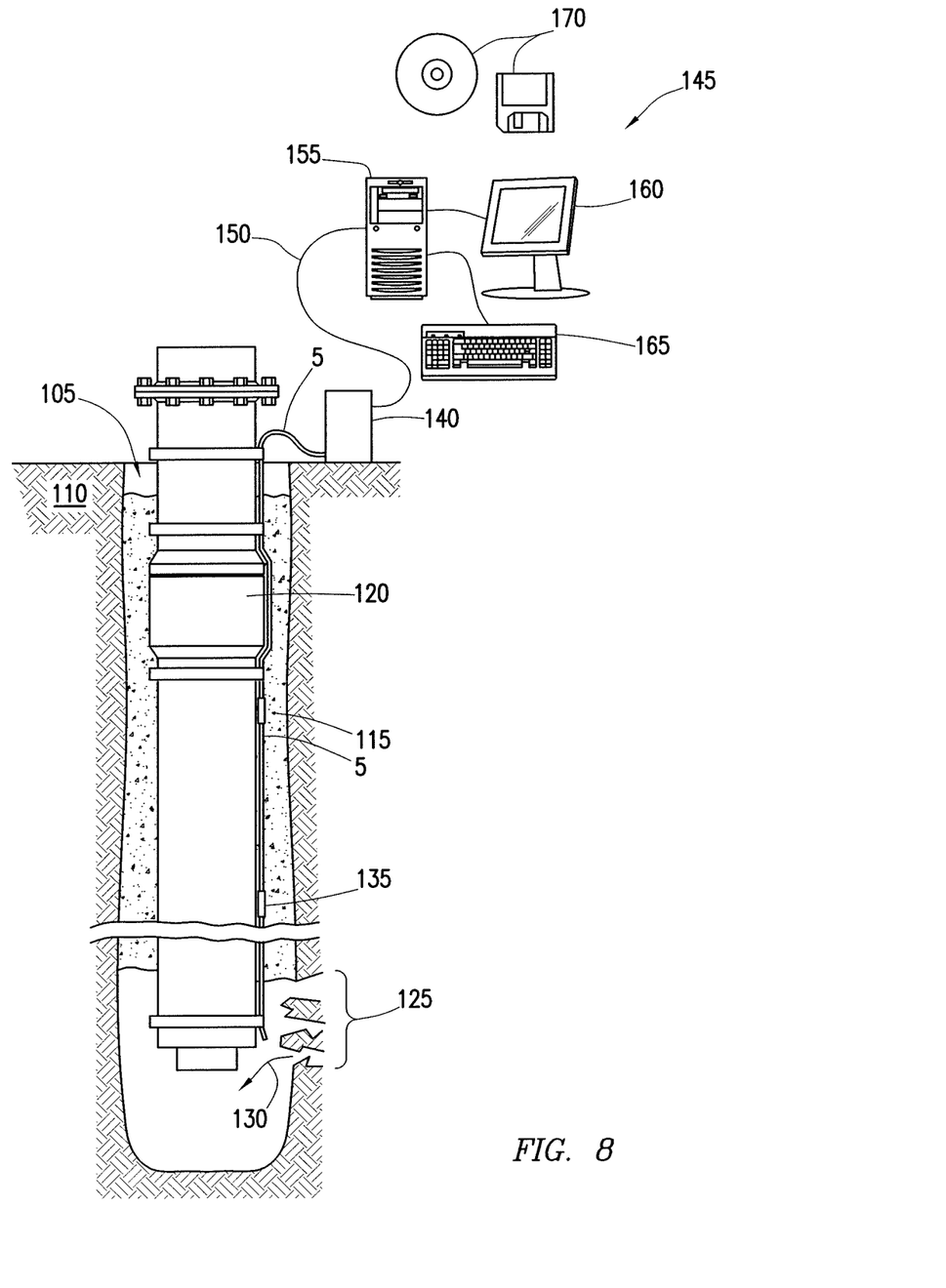
FIG. 8 generally illustrates an example system that may be representative of a well to be monitored using a waveguide.

FIG. 8 generally illustrates an example of a system that may be representative of a well to be monitored using waveguide 5. While not illustrated, a drilling rig may be used to drill and complete a well in a typical manner. The drilling system may comprise a drillstring having measurement while drilling (MWD) or logging while drilling (LWD) capability. The illustrative example of FIG. 8 may be used with any of the methods and/or waveguides described herein or discussed previously with reference to FIGS. 1-4.

The system of FIG. 8 may comprise wellbore 105 in subterranean formation 110. Cement 115 may surround casing 120 in wellbore 105 to form a production tubing string. The well may be adapted to guide a desired fluid (e.g., oil or gas) from a bottom of wellbore 105 to a surface of the earth. Perforations 125 may be formed at a bottom of wellbore 105 to facilitate the flow of a fluid 130 from subterranean formation 110 into wellbore 105 and then to the surface via a production tubing string.

Waveguide 5 may be placed along an exterior portion of casing 115 or along wellbore 105. As illustrated, the waveguide 5 may be coupled to the casing 115 and cemented in place with the casing 115. In FIG. 8, waveguide 5 may be an optical fiber, for example, optical fiber 20 discussed above with respect to FIGS. 1-4. Further, waveguide 5 comprises a protective graphene barrier, such as graphene barrier 10 discussed above with respect to FIGS. 1-4. Thus, waveguide 5 may be protected from hydrogen diffusion occurring in wellbore 105. Waveguide 5 may be coupled to one or more point sensors 135. Point sensors 135 may measure a property or quantity of fluid 130, subterranean formation 110, and/or wellbore 105. An example of these measurable properties or quantities may include, but should not be limited to, electric fields, magnetic fields, acoustic vibrations, gravity gradients, fluid flow rate, sand content, the presence of specific chemicals, and the like. These properties or quantities may induce a phase shift, but may include other properties of the light as well, in the light passing through waveguide 5. Specific information about said properties or quantities may then be inferred through comparison of the phase shift with a reference signal. Waveguide 5 may be coupled to signal generator/detector 140 at the surface that may generate a signal to be transmitted downhole or may detect a signal passing through waveguide 5.

In optional embodiments, waveguide 5 may terminate at a surface interface with an optical port adapted for coupling waveguide 5 to a light source and a detector in signal generator/detector 140. The light source may transmit light pulses along the waveguide 5. Waveguide 5 may comprise scattering impurities. As each light pulse propagates along waveguide 5, a portion of the light pulse may be scattered back along waveguide 5. The optical port of signal generator/detector 140 may communicate the backscattered light signal to the detector of the signal generator/detector 140. The detector in signal generator/detector 140 may responsively produce electrical measurements of a backscattered light phase shift at point sensors 135, or distributed sensors as shown in FIG. 8, at each point in the fiber. From the phase shift, the value of the measurement parameter sensed by waveguide 5 at the location of the back-reflection or back-scatter may be determined.

Signal generator/detector 140 may be controlled by computer system 145 which may be coupled to signal generator/detector 140 through a line 150. Computer system 145 may include central processing unit ("CPU") 155, monitor 160, keyboard 165 as well as media (e.g., optical disks, magnetic disks, flash drives) 170. Computer system 145 may be adapted to receive electrical measurement signals produced by signal generator/detector 140 and to responsively determine a distributed parameter such as, for example, distributed temperature sensing along the length of the casing string, or distributed sensing measurements of acoustic energy, vibrational energy (including active or passive seismic), pressure, strain, deformation, chemical concentrations, nuclear radiation intensity, electromagnetic energy, and/or acceleration (including gravity).

Figure 9:
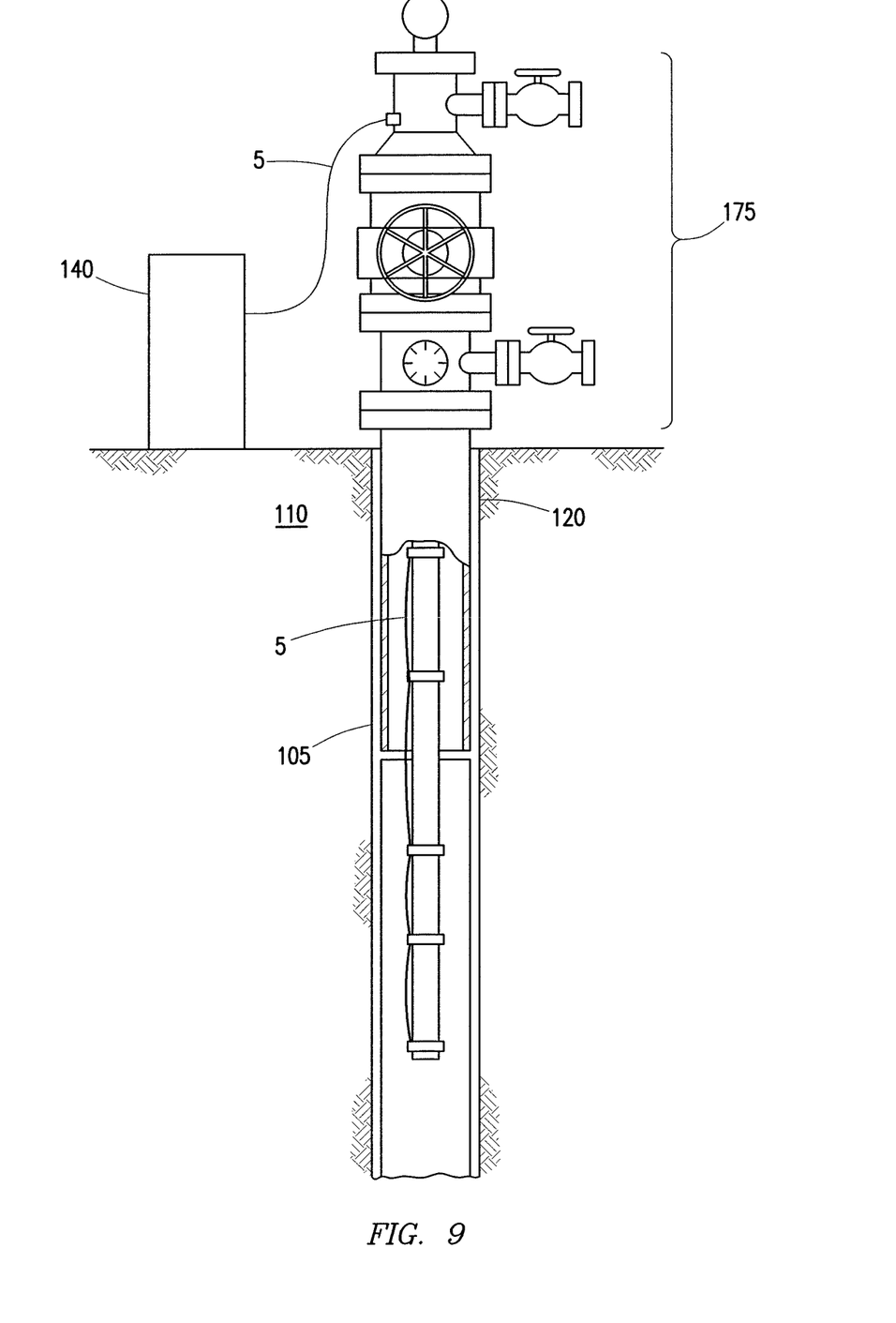
FIG. 9 generally illustrates another example system that may be representative of a well to be monitored using a waveguide.

FIG. 9 generally illustrates another example of a system that may be representative of a well being monitored using waveguide 5. In FIG. 9, waveguide 5 may be a distributed sensor as discussed above. A waveguide used as a distributed sensor may backscatter or reflect light due to impurities along the entire length of waveguide 5. Thus waveguide 5 may act as a sensor, specifically a distributed sensor. Although, FIG. 9 describes waveguide 5 as a distributed sensor, the illustrative example described by FIG. 9 may be used with any of the methods and/or waveguides described herein or discussed previously with reference to FIGS. 1-4. Waveguide 5 may be protected from hydrogen diffusion by a graphene barrier 10, such as that shown by any of the examples described herein or illustrated in FIGS. 1-4, which may prevent or slow degradation of waveguide 5 while waveguide 5 is used in the application illustrated by FIG. 9.

A series of valves 175 and other apparatuses may be used to cap the well. Casing 120 may be inserted into wellbore 105. Production tubing or a wireline may be inserted into casing 120. Waveguide 5 may be coupled within casing 120, either by attachment to the production tubing or attachment to the internal portion of casing 120. Signal generator/detector 140 may be coupled to waveguide 5 in order to transmit a signal downhole. Signal generator/detector 140 may be self-contained or coupled to a computer system as illustrated in FIG. 9.

Figure 10:
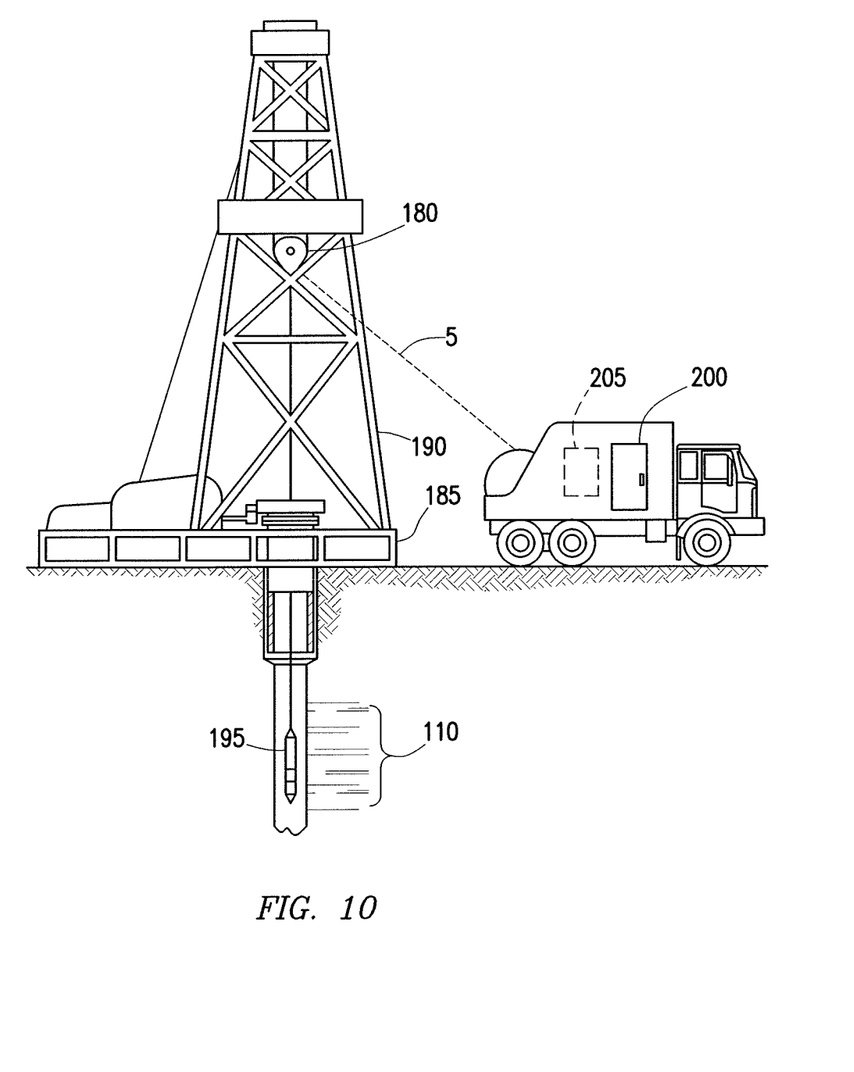
FIG. 10 generally illustrates an example wireline logging apparatus for use with a well to be monitored using a waveguide.

FIG. 10 generally illustrates another example of a system that may be representative of a technique for use of waveguide 5 in a well. FIG. 10 generally illustrates an example of a wireline logging apparatus. Hoist 180 may be included as a portion of platform 185 and used to raise or lower equipment, for example, wireline sonde 195 into or out of wellbore 105. In FIG. 10, waveguide 5 may comprise an optical cable or a bundle of optical cables, additionally; waveguide 5 may provide a communicative coupling between logging facility 200 (which may comprise a processor circuit 205 or other storage or control circuitry) and wireline sonde 195. Waveguide 5 may be protected from hydrogen diffusion by a graphene barrier 10, such as shown by any of the examples described herein or illustrated in FIGS. 1-4, which may prevent or slow degradation of waveguide 5 while waveguide 5 is used in the wireline application illustrated by FIG. 10. In this manner, information about subterranean formation 110 may be obtained with a reduced risk of waveguide 5 incurring damage due to hydrogen diffusion.

Figure 11:
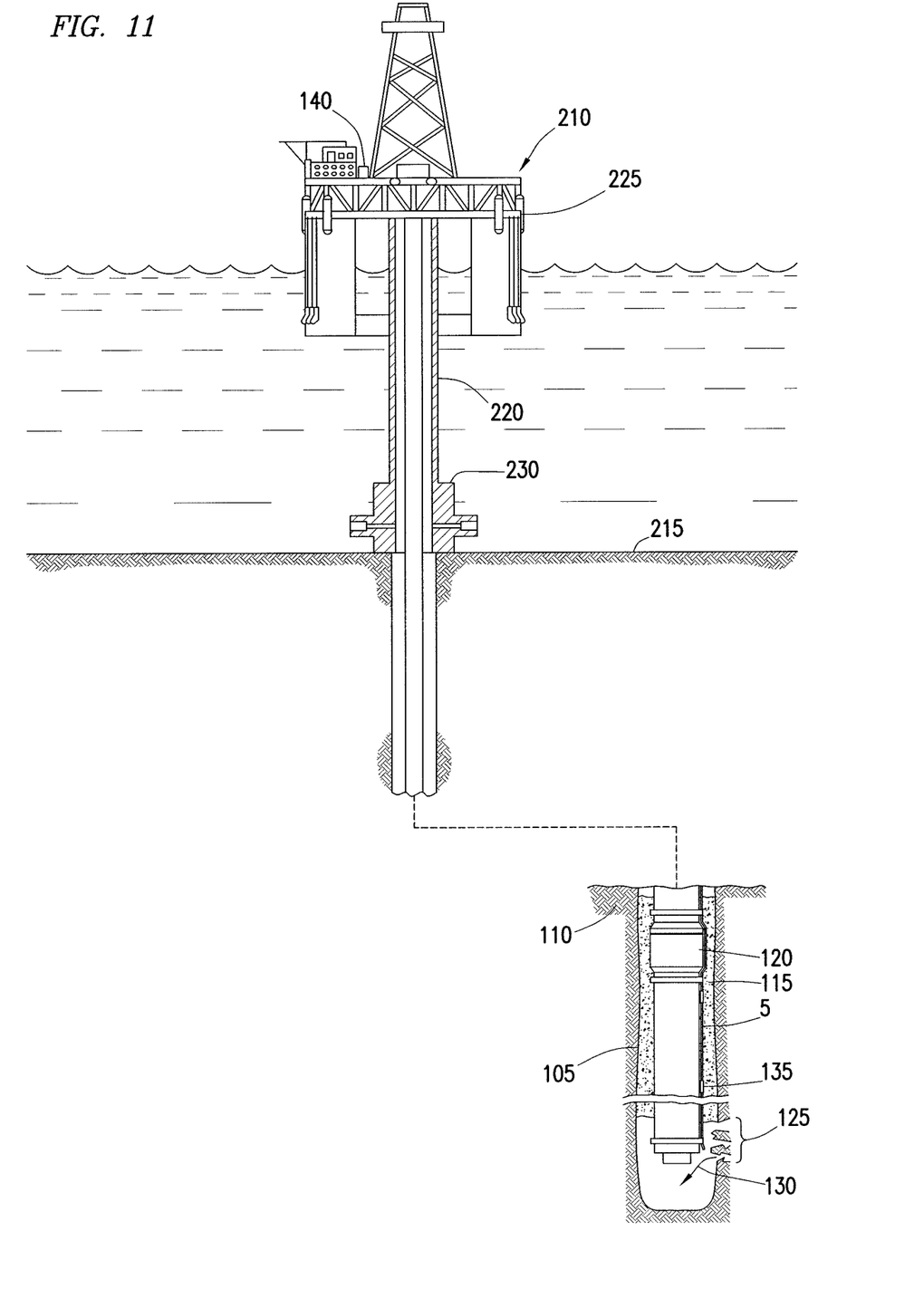
FIG. 11 generally illustrates an example system that may be representative of a subsea well to be monitored using a waveguide.

For purposes of illustration, the examples of FIGS. 8, 9, and 10 show a vertically-oriented wellbore configuration. However, the apparatus and techniques described herein may also be used in other wellbore configurations, such as a wellbore including a horizontal penetration direction, or an oblique wellbore configuration. The examples of FIGS. 8, 9, and 10 also generally illustrate land-based examples. However, the methods and systems described herein may be used in offshore environments as well, such as for subsea operations as illustrated by FIG. 11. In particular, offshore or subsea operations may include use of a wireline or an LWD/MWD apparatus and techniques including aspects of the examples herein.

FIG. 11 generally illustrates an example of a system that may be representative of a subsea well to be monitored using waveguide 5. A semi-submergible platform 210 may be centered over a submerged subterranean formation 110 located below sea floor 215. A subsea conduit 220 may extend from deck 225 of semi-submergible platform 210 to a wellhead installation 230. Beneath wellhead installation 230, wellbore 105 may penetrate subterranean formation 110. Cement 115 may surround casing 120 in wellbore 105 to form a production tubing string. The well may be adapted to guide a desired fluid (e.g., oil or gas) from a bottom of wellbore 105 to a surface of the earth. Perforations 125 may be formed at a bottom of wellbore 105 to facilitate the flow of a fluid 130 from subterranean formation 110 into wellbore 105 and then to the surface via the production tubing string.

Waveguide 5 may be placed along an exterior portion of casing 115 or along wellbore 105. In FIG. 11, waveguide 5 may be an optical fiber, for example, optical fiber 20 discussed above. Further, waveguide 5 comprises a protective graphene barrier, such as graphene barrier 10 discussed above. Thus, waveguide 5 may be protected from hydrogen diffusion occurring in wellbore 105 or in conduit 220 above seafloor 215. Waveguide 5 may be coupled to one or more point sensors 135. Point sensors 135 may measure a property of fluid 130, subterranean formation 110, and/or wellbore 105. Specific information about said properties or quantities may then be inferred through comparison of the phase shift, or some other property of light with that of the reference signal. Waveguide 5 may be coupled to signal generator/detector 140 on deck 225 that may generate a signal to be transmitted downhole or may detect a signal passing through waveguide 5.

A well monitoring system may be provided. The well monitoring system may be used in conjunction with one or more of the examples illustrated on FIGS. 1-11. The well monitoring system may comprise a waveguide comprising a graphene barrier, wherein the graphene barrier comprises at least one material selected from the group consisting of graphene, graphene oxide, and any combination thereof; a signal generator capable of generating a signal that travels through the waveguide; and a signal detector capable of detecting a signal that travels through the waveguide. The waveguide may comprise an optical fiber. The waveguide may comprise a polymer buffer. The waveguide may be disposed underneath the polymer buffer. The graphene barrier may comprise a composite material comprising graphene oxide and a polymer. The graphene barrier may comprise a tape wound around the waveguide, wherein the tape comprises a composite material comprising graphene oxide and a polymer. The waveguide may further comprise a sensor. The sensor may be a point sensor. The sensor may comprise a distributed sensor.

A method for applying a graphene barrier to a waveguide may be provided. The method may be used in conjunction with one or more of the examples illustrated on FIGS. 1-11. The method may comprise providing a waveguide; providing a material selected from the group consisting of graphene, graphene oxide, and any combination thereof;

placing at least one layer of the material on the waveguide; and covering the at least one layer of the material on the waveguide with a jacket. The waveguide may comprise an optical fiber. The jacket may comprise a polymer. The jacket may comprise a polymer and a metal. The waveguide may further comprise a sensor. The sensor may be a point sensor. The sensor may comprise a distributed sensor. The material may be placed on the waveguide after a polymer buffer is placed on the waveguide. The method may further comprise applying a second jacket to the waveguide. The step of placing at least one layer of the material on the waveguide may comprise winding a tape around the waveguide, wherein the tap comprise the material.

A method for using a waveguide in a well may be provided. The method may be used in conjunction with one or more of the examples illustrated on FIGS. 1-11. The method may comprise providing the waveguide, wherein the waveguide comprises a graphene barrier, wherein the graphene barrier comprises a material selected from the group consisting of graphene, graphene oxide, and any combination thereof; and inserting the waveguide in the well. The method may further comprise measuring a phase shift in the waveguide. The phase shift may be analyzed with a computer system. The well may be a subsea well. The waveguide may comprise an optical fiber. The waveguide may comprise a polymer buffer. The waveguide may be disposed underneath the polymer buffer. The graphene barrier may comprise a composite material comprising graphene oxide and a polymer. The graphene barrier may comprise a tape wound around the waveguide, wherein the tape comprises a composite material comprising graphene oxide and a polymer. The waveguide may further comprise a sensor. The sensor may be a point sensor. The sensor may comprise a distributed sensor.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

Therefore, the present embodiments are well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention.

What is claimed is:

1. A well monitoring system comprising:
    a waveguide comprising a graphene barrier, wherein the graphene barrier is disposed on a circumference of the waveguide, the graphene barrier extending along a length of the waveguide, wherein the graphene barrier is configured to reduce hydrogen darkening of the waveguide via at least partially preventing hydrogen diffusion through the graphene barrier and into the waveguide, and wherein the graphene barrier comprises a composite material comprising graphene oxide and a polymer;
    a signal generator capable of generating a signal that travels through the waveguide; and
    a signal detector capable of detecting a signal that travels through the waveguide.

2. A system according to claim 1, wherein the waveguide comprises an optical fiber.

3. A system according to claim 1 wherein the waveguide comprises a polymer buffer, wherein the waveguide is disposed underneath the polymer buffer.

4. A system according to claim 1, wherein the graphene barrier comprises a tape wound around the waveguide, wherein the tape comprises the composite material comprising graphene oxide and a polymer.

5. A system according to claim 1, wherein the waveguide further comprises a sensor.

6. A system according to claim 5, wherein the sensor is a point sensor.

7. A system according to claim 5, wherein the sensor comprises a distributed sensor.

8. A method for applying a graphene barrier to a waveguide comprising:
    providing a waveguide, wherein the waveguide comprises an optical fiber, and wherein the optical fiber comprises a core, a cladding, and a polymer buffer;
    providing a material selected from the group consisting of graphene, graphene oxide, and any combination thereof; and
    placing at least one layer of the material on a circumference of the waveguide between the cladding and the polymer buffer to form a graphene barrier, the graphene barrier extending along a length of the waveguide, and wherein the graphene barrier is configured to reduce hydrogen darkening of the waveguide via at least partially preventing hydrogen diffusion through the graphene barrier and into the cladding and the core of the waveguide.

9. A method according to claim 8, further comprising covering the waveguide with a jacket.

10. A method according to claim 9, wherein the jacket comprises a polymer.

11. A method according to claim 9, wherein the jacket comprises a polymer layer and a metal layer, and further comprising placing at least one layer of the material on a circumference of the jacket between the polymer layer and the metal layer to form an additional graphene barrier, the additional graphene barrier configured to reduce hydrogen darkening of the waveguide via at least partially preventing hydrogen diffusion through the additional graphene barrier and into the metal layer, the polymer buffer, the cladding, and the core of the waveguide.

12. A method according to claim 8, wherein the waveguide comprises a distributed sensor.

13. A method according to claim 8, further comprising placing at least one layer of the material on a circumference of the polymer buffer to form an additional graphene barrier, the additional graphene barrier configured to reduce hydrogen darkening of the waveguide via at least partially preventing hydrogen diffusion through the additional graphene barrier and into the polymer buffer, the cladding, and the core of the waveguide.

14. A method according to claim 8, further comprising applying a second jacket to the waveguide.

15. A method for using a waveguide in a well comprising:
    providing the waveguide, wherein the waveguide comprises a graphene barrier disposed on a circumference of the waveguide, the graphene barrier extending along a length of the waveguide, wherein the graphene barrier is configured to reduce hydrogen darkening of the waveguide via at least partially preventing hydrogen diffusion through the graphene barrier and into the waveguide, wherein the graphene barrier comprises a composite material comprising graphene oxide and a polymer; and
    inserting the waveguide in the well.

16. A method according to claim 15 further comprising measuring a phase shift in the waveguide.

17. A method according to claim 16, wherein the phase shift is analyzed with a computer system.

18. A method according to claim 15 wherein the well is a subsea well.

19. A device comprising:
a waveguide comprising:
- an optical fiber, wherein the optical fiber comprises a core, a cladding, and a polymer buffer; and
- a graphene barrier, wherein the graphene barrier is disposed on a circumference of the waveguide between the cladding and the polymer buffer, the graphene barrier extending along a length of the waveguide, wherein the graphene barrier is configured to reduce hydrogen darkening of the waveguide via at least partially preventing hydrogen diffusion through the graphene barrier and into the cladding and the core of the waveguide, and wherein the graphene barrier comprises at least one material selected from the group consisting of graphene, graphene oxide, and any combination thereof.

* * * * *